(12) United States Patent
Areso et al.

(10) Patent No.: US 8,124,148 B2
(45) Date of Patent: Feb. 28, 2012

(54) METHOD OF OBTAINING SMOKED FOOD PRODUCTS WITH MARKS AND PRODUCT THUS OBTAINED

(75) Inventors: Carlos Longo Areso, Pamplona (ES); Jesus Esparza Imas, Pamplona (ES); Juan Jose Gato Peciña, Pamplona (ES)

(73) Assignee: Viscofan, S.A., Pamplona (ES)

( * ) Notice: Subject to any disclaimer, the term of this patent is extended or adjusted under 35 U.S.C. 154(b) by 743 days.

(21) Appl. No.: 12/094,375

(22) PCT Filed: Nov. 20, 2006

(86) PCT No.: PCT/ES2006/000641
§ 371 (c)(1),
(2), (4) Date: Aug. 12, 2008

(87) PCT Pub. No.: WO2007/057492
PCT Pub. Date: May 24, 2007

(65) Prior Publication Data
US 2009/0202681 A1   Aug. 13, 2009

(30) Foreign Application Priority Data
Nov. 21, 2005  (ES) .................................. 200502848

(51) Int. Cl.
*A23B 4/00* (2006.01)
(52) U.S. Cl. ........................... 426/92; 426/250; 426/105
(58) Field of Classification Search .................... 426/83, 426/92, 250, 105
See application file for complete search history.

(56) References Cited

U.S. PATENT DOCUMENTS

| | | | |
|---|---|---|---|
| 1,959,978 A | 5/1934 | Freund | |
| 2,521,101 A | 9/1950 | Thor | |
| 2,961,323 A | 11/1960 | Underwood et al. | |
| 2,983,949 A | 5/1961 | Matecki | |
| 3,115,668 A | 12/1963 | Townsend | |
| 3,794,515 A | 2/1974 | Turbak et al. | |
| 3,860,728 A | 1/1975 | Tanner et al. | |
| 3,961,082 A | 6/1976 | Winkler | |
| 4,384,006 A | 5/1983 | Wallick | |
| 4,657,765 A | 4/1987 | Nicholson et al. | |

(Continued)

FOREIGN PATENT DOCUMENTS
DE   19951614   10/2000
(Continued)

OTHER PUBLICATIONS

Francis, Frederick J. (1999). Wiley Encyclopedia of Food Science and Technology (2nd Edition) vols. 1-4. (pp. 1579-1581). John Wiley & Sons. Online version available at: http://www.knovel.com/web/portal/browse/display?_EXT_KNOVEL_DISPLAY_bookid=681&VerticalID=0.*

(Continued)

*Primary Examiner* — Rena Dye
*Assistant Examiner* — Chaim Smith
(74) *Attorney, Agent, or Firm* — Notaro, Michalos & Zaccaria P.C.

(57) ABSTRACT

The present invention basically consists of printing proofing marks on a film, placing it in contact with a food product, followed by an intense drying at low relative moisture and a smoking step which also occurs at low relative moisture for obtaining areas having a more smoked color in the food product under the proofing marks than in the areas not protected by said proofing marks.

20 Claims, 1 Drawing Sheet

U.S. PATENT DOCUMENTS

| | | | |
|---|---|---|---|
| 4,905,587 A | 3/1990 | Smithers |
| 5,084,283 A | 1/1992 | Oxley et al. |
| 5,085,890 A | 2/1992 | Niaura et al. |
| 5,270,067 A | 12/1993 | Underwood et al. |
| 5,762,968 A | 6/1998 | Swaidner et al. |
| 5,782,683 A | 7/1998 | Stall |
| 5,834,076 A | 11/1998 | Ferrero et al. |
| 6,032,701 A | 3/2000 | Kearby et al. |
| 2003/0039724 A1 | 2/2003 | DuCharme, Jr. et al. |
| 2004/0142127 A1 | 7/2004 | Delius et al. |
| 2005/0008742 A1 | 1/2005 | Griesbach et al. |

FOREIGN PATENT DOCUMENTS

| | | |
|---|---|---|
| ES | 2097704 | 4/1997 |
| WO | WO 00/75220 A1 | 12/2000 |
| WO | WO 02/094023 A2 | 11/2002 |
| WO | WO 2004/094544 A1 | 11/2004 |
| WO | WO 2005/006889 A1 | 1/2005 |

OTHER PUBLICATIONS

Reinhard Hartecker and Michael Weisenfels; Ways of Integrating Artificial Sausage Skins in a Marketing Strategy for Branded Products: Sausages with a Logo; pp. VI-IX; Die Floischorei Jan. 1993.

* cited by examiner

FIG. 1.1
(PRIOR ART)
FIG. 1.2
(PRIOR ART)
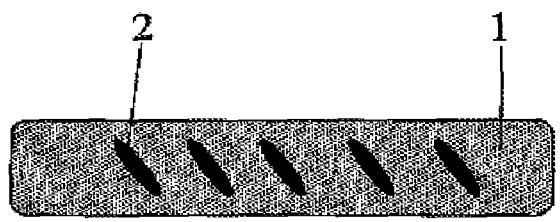
FIG. 2

METHOD OF OBTAINING SMOKED FOOD PRODUCTS WITH MARKS AND PRODUCT THUS OBTAINED

OBJECT OF THE INVENTION

The present invention is based on a method of obtaining smoked food products with marks using films enveloping or encasing the food product provided with areas with different permeability with respect to water and smoke by means of which areas are obtained on the surface of the food product, in correspondence with the position of the marks, during the smoking step having a darker smoked color than that on the rest of its surface, generating on the food product surface the desired indicia, such as a logotype, photographs, grill type marks or the like.

Another object of the invention is that this film consists of a casing used for stuffing meat products for the purpose of reproducing in said products indicia with different smoke tones.

BACKGROUND OF THE INVENTION

For quite some time, intestines of domestic animals have been used to produce cured meats. The manufactured products introduced in these casings were then subjected to different processes (cooking, fermenting . . . ) until obtaining the end food products.

The natural casings have been imitated by man, which has given rise to the production of artificial casings. Artificial casings are tubular wrappings having very defined characteristics intended for the production of food products, such as sausages, salami and a wide variety of cured meats.

Artificial casings are made of a plastic material (for example polyamides) and casings are also made of cellulose, either alone or with the reinforcement of a fibrous paper, acting as a mold for the manufacture of the cured meat at a specific diameter as a container for its transport and they can even incorporate a drawing or the manufacturer's mark. These artificial casings are not eaten with the rest of the cured meat and must be pealed before final consumption.

Other artificial casings are even prepared from an edible material, such as collagen extracted from cows or pigs and they give rise to casings that can be consumed together with the cured meat itself similar to those cured meats produced with natural casings.

In some cases, however, especially in high caliber casings, the casings are provided in individual portions intended for stuffing a food product or in balls intended for manufacturing a smaller number of food products, artificial casings are usually subjected to a special process called "shirring" before their sale.

In this shirring process, the casing is wrinkled in an orderly manner like the folds of an accordion, forming tubular shirred wrappings providing long casing lengths in a form that is easy to stuff in automatic machines, such as the one described in U.S. Pat. No. 3,115,668 (Townsend). This shirring process and an example of its application are described for example in U.S. Pat. Nos. 2,983,949 (Matecki) and 5,782,683 (Stall).

During the shirring process it is common to add different substances to the casing, such as a small amount of oil for lubricating it and which resists the shirring process without breaking, or an internal spray that can incorporate different substances, such as wetting agents such as water, glycerin or agents contributing to the easy later pealing of the casing from the rest of the stuffed meat product.

Casings are also known in the state of the art which can transfer color to the cured meat produced with them, as in the case of U.S. Pat. No. 2,521,101 (Thor) or U.S. patent application 2003/0039724 A1 (Viskase).

Other casings contain a caramel coloring agent providing a pleasant brown color to the sausage surface, such as those described in U.S. Pat. No. 3,860,728 or WO 2004/094544 A1 (Teepak).

Other casings contain a product developing its brown color by reaction when subjected to high temperatures, as in U.S. Pat. No. 5,270,067 (Underwood)

There are a number of patents, such as U.S. Pat. No. 4,657,765 (Viskase) and U.S. Pat. No. 6,032,701 (Teepak), intended for the production of casings which transfer liquid smoke to the sausage surface and which replace or lessen the need for the smoking step in the manufacture of sausages.

It is known from the prior art that cellulose casings (with or without fibrous reinforcement) have a high permeability to water since they are formed by a highly hydrophilic material and they are also permeable to smoke, especially to its low molecular weight compositions.

Cellulose casings (especially the fibrous type) have also been provided with an impermeable coating completely covering the casing for several applications, as in U.S. Pat. Nos. 2,961,323 (Underwood) and 3,794,515 (Turbak). These casings are normally used in cured meats requiring low permeability to water. This complete impermeability generally means that they are not permeable to smoke either.

Plastic casings generally have low permeability to water and they are generally not permeable to smoke either, which is a serious disadvantage for the manufacture of smoked cured meats. However, several patents have recently been proposed which mention the development of plastic casings with an increased permeability to smoke, such as the application of patent WO 00/75220 A1 (Eriksson AB) and WO 02/094023 A2 (Kalle).

On the other hand, casings are known in the state of the art which are able to bear a certain drawing or pattern which the cured meat will later incorporate, such as for example in U.S. Pat. No. 3,961,082 of Naturin, relating to printed edible collagen.

Printing logos or marks on cellulose casings, especially grill type marks, transferred to the sausage surface during the cooking process, has also been the object of several patents, as described in U.S. Pat. Nos. 5,084,283 and 5,085,890 (Viskase). However, this process is complex due to the need to turn the casing inside out before or during stuffing, which makes it virtually useless in practice.

In the manufacture of heat-treated meat products, so-called grill marks are normally produced on their surface, which are very appealing to the consumer. The combination of high temperatures of the wires used as the grill in grilling meat products which are in contact with the food product cause dark brownish marks, usually following a characteristic pattern and appealing to the consumer.

Producing grill type marks on food products is the object of several patents, such as U.S. Pat. No. 4,384,006 which uses hot wires that come into contact with the food while at the same time moving forward and turning so as to form an uninterrupted spiral mark on the sausage surface.

U.S. Pat. No. 4,905,587 (Conagra) applies a thin layer of liquid to the meat during its stuffing into the casing and describes that it can be adapted to produce grill type marks.

U.S. Pat. No. 5,762,968 contemplates the use of spraying marks which imitate grill type marks on food products.

U.S. patent application 2005/0008742 A1 and its equivalent WO 2005/006889 A1 provides a method of mark different food products by means of jets of coloring solutions making marks on the food products similar to grill type marks, and the color of which is developed after the food product is subjected to heat treatment.

U.S. Pat. No. 5,834,076 describes a casing for cured meats on which indicia such as marks, logotypes, texts or anagrams have been printed with a material that is impermeable to smoke or to coloring substances. While processing the cured meat, the area of the casing that is not printed on allows the passage of the smoking or coloring substances to the corresponding area of the sausage, whereas the area of the sausage surface corresponding to the area of the casing which has been printed with said proofing material remains without smoking or coloring agents. Therefore, if for example marks simulating grill marks are printed on the casing with a composition that is impermeable to smoke, sausages will be obtained with an essentially smoke colored surface and marks that are equivalent to those marks printed on the casing, but with no smoked color, i.e. with the original color of the meat emulsion, which is usually much lighter than the smoked color, and therefore whitish grill marks will remain on a smoked background, which is not an appealing effect for the consumer, because even though the design of the forms is suitable, the color pattern does not resemble the marks produced on the sausage while being cooked on a grill.

U.S. Pat. No. 5,834,076 sets forth another alternative method in which essentially the entire surface of the casing is printed with a proofing composition, but leaving gaps corresponding to the marks, logotypes or anagrams that are to appear on the sausage. In this case, the coloring substances of the smoke will essentially penetrate the gaps corresponding to the printed marks, and in the case of being grill type marks, a generally non-smoked sausage will be obtained, therefore having a clear tone with darker smoke colored grill type marks, which is a more appealing effect for the consumer. However, even though this method produces a desired effect, it has drawbacks because it requires a much higher consumption of the proofing composition, it requires printing virtually the entire casing on both sides, and in the case of products intended to be smoked, it produces a virtually non-smoked surface appearance of the cured meat.

DESCRIPTION OF THE INVENTION

The present invention proposes a process of obtaining smoked food products which contemplates the use of a film which encases the food product or in which the food product is stuffed, which film has marks that are impermeable to smoke and water, for example a logo, legend or grill type marks, which are reproduced on the food product surface during the smoking step and which are distinguished by the different color tones with respect to the rest of the food product surface.

The process of obtaining the food product is carried out according to the steps of:

printing proofing marks which are impermeable to water and smoke on the entire film or on a part thereof, coating the food product with at least the printed part of the film, intense drying at a relative moisture of less than 25%, smoking under the same moisture conditions so as to obtain areas on the food product surface in correspondence with the position of the marks with a darker smoked color than that obtained on the rest of the surface.

Unlike other known solutions, the smoking of the entire food product surface with one tone in the area of its surface corresponding to the marks of the film can be obtained which is darker from the rest of the surface. This result is a consequence of the conditions in which the drying and smoking steps occur, as has been described, with a relative moisture of less than 25%, preferably less than 20%, or less than 15% or more preferably less than 10%.

The drying operation is preferably carried out in an oven in which the intrinsic moisture of the food product is eliminated. As the marks are impermeable to water, the area of the food product surface under the marks remains moist, therefore the smoke is dissolved in the smoking step preferably in these moist areas, giving rise to a darker tone than the one obtained in the rest of the food product surface which lacks marks and is virtually moisture-free.

It is complementarily and optionally contemplated that during the smoking step and before reacting with the smoke coloring compounds, the food product surface is moistened and washed, entraining the smoke compounds that have initially been diffused in the general moist surface. The areas under the proofing marks contain the smoke compounds that have been received by diffusion and are protected by said marks against the washing action, which compounds can react with the food product, giving rise to areas with more smoked color, therefore obtaining a general surface with little smoked color in comparison with the areas corresponding to the marks remaining with more smoked color.

The present invention preferably contemplates that the food product surface has a low surface moisture content when it receives the addition of the smoke in gas state. This requirement can be obtained in different ways; a preferred way is to carry out an intense drying step on the food product coated by the film prior to the application of smoke. Another preferred way is to lower the oven temperature set point right after the smoking step, thereby causing the heat being released from the product to the environment to stop, therefore an entraining effect of the coloring components of the smoke outwardly from the product may occur.

The invention can generally be applied to the representation of marks, logotypes, drawings, photographs, texts, anagrams, or the like which will appear on the food product surface with a more intense tone than the general background.

The possibility of the proofing marks consisting of a mesh with small impressions defining a specific geometry is contemplated, allowing the impregnation by smoke under all the small impressions forming the mesh, giving rise to a macroscopic smoked effect on the product surface that is similar to but faster and more even than with the impression of a single continuous mark. In this case there is no limit as to the maximum size of the printed indicia that can be used.

This mesh with small impressions may cause, according to the size and separation of the small impressions, areas with more or less smoked intensity, thereby using an advantageous combination of the usual screens and designs in the graphic art field can allow producing marks with areas having different smoking intensities, such as drawings or even simple photographs which can be reproduced on the food product surface according to the method of the present invention.

The proofing composition intended to be printed on the food product for producing marks can be based on various well known proofing substances with the addition of other coadjuvant compounds, such as dyes for visually detecting the correct impression of the marks or logotypes, plasticizers, solvents, fixing agents, waxes or other products if needed.

The proofing composition may include polyvinylidene chloride, polyamide, polyacrylonitrile, ethylene-vinyl alcohol copolymers (EVOH), or other similar substances. The proofing composition may also be formed by oily or waxy substances, such as waxes.

The proofing composition needs not be completely impermeable, rather it is sufficient for it to be moderately impermeable, allowing differential drying of the printed indicia with respect to the general surface.

The proofing composition can also be a conventional printing ink in which the content of products, such as dye particles, talcum scales or other products provide it with partial impermeability.

In a possible embodiment the food product may consist of smoked salmon or ham and the film in its wrapping.

However the method object of the present invention is preferably applicable for the case that the film consists of a casing and the food product consists of a meat product stuffed in said casing. According to the proposed process, an essentially smoked meat product is obtained from a casing in which grill type marks have been printed with an impermeable composition, in which product these grill type marks have a more intense smoked tone than the general smoked background.

The general tone of the meat product surface may also be obtained by any of the known methods in the meat processing, such as the application of other smoking steps, the use of liquid smoke or the use of coloring compounds included in the casing, such as liquid smokes, caramel, natural coloring agents or compounds which develop a brown color upon reaction.

The method of the present invention has the advantage of needing a lower consumption of coating composition than when the method proposed in U.S. Pat. No. 5,834,076 is used to obtain the same pattern of dark marks.

In the event that the casing is printed with an impermeable composition, the marks appearing as a result of the smoking on the food product surface are shown as positive if the casing is subjected to a conventional process or negative if the process occurs according to the present invention.

An advantage of the use of this method in comparison with the methods proposed in U.S. Pat. Nos. 5,084,283 and 5,085,890 (Viskase) is that additional coloring compounds such as food colorants, which would require being declared and listed on the meat product composition label, are not used, but rather they are the coloring characteristics of the smoke which provide the design on the cured meat surface together with the casing printed with the proofing composition and the process of the present invention, giving way to a more natural appearance than the aforementioned casing in which there are marks which are whiter than the rest.

An additional advantage of the present invention is that it prevents the formation of unwanted compounds such as PAHs (polycyclic aromatic hydrocarbons), which can be formed during the process of placing cured meat in contact with a grill at a high temperature for forming the "grill marks".

The present invention further has the additional advantage that it does not require cured meat manufacturers to add and maintain a spray system, as described in U.S. Pat. No. 5,762,968, making the process easier to apply on an industrial level.

In a preferred application of the present invention, the casing used is a cellulose casing bearing a series of marks printed thereon simulating grill type marks with a composition having a reduced permeability to smoke and water.

Grill type marks will preferably have a width comprised between 0.1 mm and 20 mm. If designs with a width of less than 0.1 mm are used, it is possible for the indicia to be not easily distinguishable on the meat product surface, and if designs with a width of greater than 20 mm, it is possible that the migration of the smoke compounds will not reach the central areas of the design, leaving areas with little coloring inside the mark although they can be used if desired to produce a desired special effect.

The casing to be used can be a low caliber cellulose casing (made from derivatized or non-derivatized cellulose) or a casing reinforced with a fibrous material.

The casing to be used can also be a casing made with a polymeric material (such as plastic casing). In this case, it will preferably be a material with a significant permeability to smoke.

The casing to be used can also be an artificial regenerated collagen casing.

DESCRIPTION OF THE DRAWINGS

To complement the description being made and for the purpose of aiding to better understand the features of the invention according to a preferred practical example thereof, a set of drawings is attached as an integral part of said description in which the following is shown with an illustrative and non-limiting character:

FIGS. 1.1 and 1.2 show the sausages obtained according to conventional processes from the state of the art in which there appear whitish grill type marks on a smoked background or dark marks on a whitish background.

FIG. 2 shows a sausage obtained according to the process object of this invention in which the dark grill marks are observed with a more intense smoked tone than the general also smoked background.

EMBODIMENTS OF THE INVENTION

Example 1

An impermeable composition having the following features is provided:

The composition is a solution containing 17 g of PVDC dissolved by gentle stirring in 66 g of ethyl acetate. While stirring is maintained, 0.6 g of blue dye (Irgalithe BLP Ciba-Geigy Blue) and 6.4 g of micronized paraffin wax (Deuteron Wax TF) are added. The mixture is stirred vigorously for 10 minutes. Then 0.7 g of Deuteron Wax TF and 9.3 g of crosslinker, in this case N,N',N'''-tris (isocyanate-hexamethylene) Bayer Ag Biuret, dissolved in ethyl acetate, are added. The viscosity is then adjusted with the same solvent to 20" with a Ford No. 4 cup.

A design similar to grill type marks is then printed with said impermeable composition on the cellulose casing intended for the production of sausages.

The described casing is stuffed with a meat emulsion formed according to the following composition:

| | |
|---|---|
| Pig's shoulder: | 35% |
| Dewlap: | 35% |
| Water/ice: | 25% |
| Salt: | 1.7% |
| Tripolyphosphate: | 0.5% |
| Sodium nitrate: | 0.02% |
| Caseinate: | 2% |
| Spices: | 1.25% |

Then the previous composition is subjected to the cooking cycle:

| STEP | Time (min) | Temperature (° C.) | Observations |
|---|---|---|---|
| Drying 1 | 35 | 50 | |
| Drying 2 | 30 | 55 | |
| Ignition | 5 | 55 | Smoke production begins |
| Smoking 1 | 10 | 60 | |
| Smoking 2 | 5 | 65 | |
| Smoking 3 | 5 | 70 | |
| Cooking | 15 | 75 | Cooking |

The relative humidity set point established in the oven is 0 in all steps, except in the cooking step in which it is 100%, and in the smoking steps in which they have no set point.

The casing is then peeled and removed from the cured meat surface. The sausages have a similar appearance to those in FIG. 2 with a general smoked color background (1) and marks (2) similar to grill marks with a darker color than the general background of the sausage.

Example 2

Another cooking cycle for the aforementioned casing and meat emulsion is described in this example.

| STEP | Time (min) | Temperature (° C.) | Observations |
|---|---|---|---|
| Drying 1 | 40 | 60 | Drying |
| Ignition | 4 | 70 | Smoke production begins |
| Smoking | 15 | 70 | |
| Drying | 40 | 50 | |
| Cooking | 20 | 80 | Cooking |

The relative moisture set point is 0 in all steps, except in the cooking step in which it is 100%, and in the smoking step in which it has no set point.

The casing is then peeled and removed from the cured meat surface obtaining similar results to those obtained in Example 1.

The invention claimed is:

1. A process for obtaining smoked food products with darker marks on surfaces of the food products, comprising the steps:
    (a) printing proofing marks that are substantially impermeable to water and smoke into the surface of a film that is substantially permeable to water and smoke to create a printed part of the film;
    (b) coating the surface of a food product with at least the printed part of the film;
    (c) drying the food product and the printed part of the film coating the surface of the food product, to a relative moisture of less than 25%;
    (d) smoking the food product and the printed part of the film coating the surface of the food product so as to obtain areas on the surface of the food product in correspondence with the position of the proofing marks with a darker smoked color mark appearing beneath the proofing marks than on a remainder of the surface of the food product.

2. The process of obtaining smoked food products according to claim 1, wherein the smoked food product is dried to a relative moisture of less than 20%.

3. The process of obtaining smoked food products according to claim 1, wherein the smoked food product is dried to a relative moisture of less than 15%.

4. The process of obtaining smoked food products, according to claim 1, wherein the smoked food product is dried to a relative moisture of less than 10%.

5. The process of obtaining smoked food products according to claim 1, wherein the proofing marks consist of grill mark bands.

6. The process of obtaining smoked food products according to claim 1, wherein the proofing marks consist of a mesh with impressions defining a specific geometry which is reproduced in smoked tones in the food product surface.

7. The process of obtaining smoked food products according to claim 1, wherein the film consists of a casing.

8. The process of obtaining smoked food products according to claim 7, wherein the casing is chosen from the group consisting of: a collagen casing, a cellulose casing, a fibrous casing and a plastic casing.

9. A smoked food product with darker marks beneath the proofing marks obtained by the process of claim 1.

10. The process of obtaining smoked food products according to claim 1, wherein the food product consists of a meat product.

11. A process for obtaining smoked food products with darker marks on surfaces of the food products, comprising the steps:
    (a) printing proofing marks that are substantially impermeable to water and smoke onto the surface of a film that is substantially permeable to water and smoke to create a printed part of the film;
    (b) coating the surface of a food product with at least the printed part of the film;
    (c) drying the food product and the printed part of the film coating the surface of the food product, to a relative moisture of less than 25%;
    (d) smoking the food product and the printed part of the film coating the surface of the food product so as to obtain areas on the surface of the food product beneath the position of the proofing marks with a darker smoked color mark than on a remainder of the surface of the food product; and
    (e) during the smoking step and before coloring compounds of the smoke react with the surface of the food product, moistening and washing the surface of the food product for entraining the coloring compounds which have been diffused on the moist surface of the food product, the coloring compounds received by diffusion and remaining under the proofing marks then reacting with the food product giving rise to areas with the darker smoked color marks.

12. The process of obtaining smoked food products according to claim 11, wherein the smoked food product is dried to a relative moisture of less than 20%.

13. The process of obtaining smoked food products according to claim 11, wherein the smoked food product is dried to a relative moisture of less than 15%.

14. The process of obtaining smoked food products according to claim 11, wherein the smoked food product is dried to a relative moisture of less than 10%.

15. The process of obtaining smoked food products according to claim 11, wherein the proofing marks consist of grill mark bands.

16. The process of obtaining smoked food products according to claim 11, wherein the proofing marks consist of a mesh with impressions defining a specific geometry which is reproduced in smoked tones in the food product surface.

17. The process of obtaining smoked food products according to claim 11, wherein the film consists of a casing.

18. The process of obtaining smoked food products according to claim 17, wherein the film consists of a casing chosen from the group consisting of: a collagen casing, a cellulose casing, a fibrous casing and a plastic casing.

19. The process of obtaining smoked food products according to claim 11, wherein the food product consists of a meat product.

20. A smoked food product with darker marks beneath the proofing marks obtained by the process of claim 11.

* * * * *